United States Patent
Gross et al.

(10) Patent No.: US 8,046,112 B2
(45) Date of Patent: Oct. 25, 2011

(54) METHOD AND APPARATUS FOR CONTROLLING TEMPERATURE VARIATIONS IN A COMPUTER SYSTEM

(75) Inventors: Kenny C. Gross, San Diego, CA (US);
Ayse K. Coskun, La Jolla, CA (US);
Keith A. Whisnant, San Diego, CA (US); Aleksey M. Urmanov, San Diego, CA (US)

(73) Assignee: Oracle America, Inc., Redwood Shores, CA (US)

( * ) Notice: Subject to any disclaimer, the term of this patent is extended or adjusted under 35 U.S.C. 154(b) by 189 days.

(21) Appl. No.: 12/102,245

(22) Filed: Apr. 14, 2008

(65) Prior Publication Data
US 2009/0259347 A1   Oct. 15, 2009

(51) Int. Cl.
*G05D 23/00* (2006.01)
*G05B 15/00* (2006.01)
*G01K 17/00* (2006.01)

(52) U.S. Cl. .......... 700/299; 700/276; 702/130

(58) Field of Classification Search .......... 700/299, 700/276; 702/130
See application file for complete search history.

(56) References Cited

U.S. PATENT DOCUMENTS

| 4,888,247 | A  | * | 12/1989 | Zweben et al. | 428/105 |
|---|---|---|---|---|---|
| 5,971,068 | A  | * | 10/1999 | Ochiai et al. | 165/290 |
| 2005/0114739 | A1 | * | 5/2005 | Gupta et al. | 714/39 |
| 2005/0273208 | A1 | * | 12/2005 | Yazawa et al. | 700/299 |
| 2006/0130468 | A1 | * | 6/2006 | Sun et al. | 60/297 |
| 2007/0252544 | A1 | * | 11/2007 | Chotoku et al. | 318/268 |

* cited by examiner

*Primary Examiner* — Kidest Bahta
*Assistant Examiner* — Sivalingam Sivanesan
(74) *Attorney, Agent, or Firm* — Park, Vaughan, Fleming & Dowler LLP

(57) ABSTRACT

Some embodiments of the present invention provide a system that controls temperature variations in a computer system. During operation, a telemetry variable of the computer system is monitored. Next, a future temperature of the computer system is predicted based on the telemetry variable. A signal is then generated in response to the future temperature. Then, the signal is sent to a cooling device in the computer system to control temperature variations of the computer system.

20 Claims, 2 Drawing Sheets

METHOD AND APPARATUS FOR CONTROLLING TEMPERATURE VARIATIONS IN A COMPUTER SYSTEM

BACKGROUND

1. Field

The present invention relates to techniques for enhancing the performance of computer systems. More specifically, the present invention relates to a method and apparatus for controlling temperature variations in a computer system.

2. Related Art

As semiconductor integration densities within computer systems continue to increase at an exponential rate, thermal dissipation problems are become increasingly problematic. In particular, as the operating temperatures of chip packages become higher, thermal cycling effects can begin to adversely affect the reliability of computer system internals. A number of degradation mechanisms are accelerated by thermal cycling at high temperatures, including accelerated solder fatigue; interconnect fretting; differential thermal expansion between bonded materials; delamination failures; thermal mismatches between mating surfaces; differentials in the coefficients of thermal expansion between materials used in chip packages; wirebond shear and flexure fatigue; passivation cracking; electromigration failures; electrolytic corrosion; thermomigration failures; crack initiation and propagation; delamination between chip dies and molding compounds, as well as between the molding compound and the leadframe; die de-adhesion fatigue; repeated stress reversals in brackets leading to dislocations, cracks, and eventual mechanical failures; deterioration of connectors through elastomeric stress relaxation in polymers; and others.

One solution to this problem is to dampen the thermal cycling by "chip throttling" and/or "trash burning." For example, chip throttling can involve reducing processor clock frequencies when processor workloads are high, and trash burning can involve increasing processor workloads to raise the mean package temperature when workloads are low. Unfortunately, when the workload is high and chip throttling kicks in, system throughput is reduced at the time a customer application needs it the most. Moreover, this can create a "snowball" effect because when application demand is high, throughput slows down, which can cause application demand to pile up, which can cause throughput to slow down even further. Moreover, trash burning consumes electricity without doing useful computational work, which can generate greenhouse gases at some distant power plant.

Hence, what is needed is a method and apparatus for controlling temperature variations in a computer system without the above-described problems.

SUMMARY

Some embodiments of the present invention provide a system that controls temperature variations in a computer system. During operation of the computer system, a telemetry variable of the computer system is monitored. Next, a future temperature of the computer system is predicted based on the telemetry variable, and a signal is generated in response to the future temperature. Then the signal is sent to a cooling device in the computer system to control the temperature variation in the computer system.

In some embodiments, monitoring the telemetry variable includes systematically monitoring and recording a set of performance parameters of the computer system, wherein the recording process keeps track of the temporal relationships between events in different performance parameters.

In some embodiments, predicting the future temperature of the computer system includes using an autoregressive moving average to predict the future temperature of the computer system.

In some embodiments, predicting the future temperature of the computer system includes predicting the future temperature a predetermined amount of time in the future, wherein the predetermined amount of time is determined based on parameters including a thermal inertia of the computer system.

In some embodiments, predicting the future temperature of the computer system includes predicting the future temperature a predetermined amount of time in the future, wherein the predetermined amount of time is determined based on parameters including an amplitude of temperature oscillations in a computer system.

In some embodiments, sending the signal to the cooling device to control temperature variations includes controlling the temperature variations so that the temperature variations stay within a range surrounding a target temperature.

In some embodiments, monitoring the telemetry variable includes systematically monitoring and recording a set of performance parameters of the computer system, wherein the recording process keeps track of the temporal relationships between events in different performance parameters. Moreover, predicting the future temperature of the computer system includes using an autoregressive moving average to predict the future temperature of the computer system, and generating the signal includes generating a signal to control the temperature variations so that the temperature variations stay within a predetermined range surrounding a target temperature.

In some embodiments, the cooling device includes a fan, and sending the signal to the cooling device includes sending a signal to the fan to control a speed of the fan.

DETAILED DESCRIPTION

The following description is presented to enable any person skilled in the art to make and use the disclosed embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present description. Thus, the present description is not intended to be limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

Figure 1:
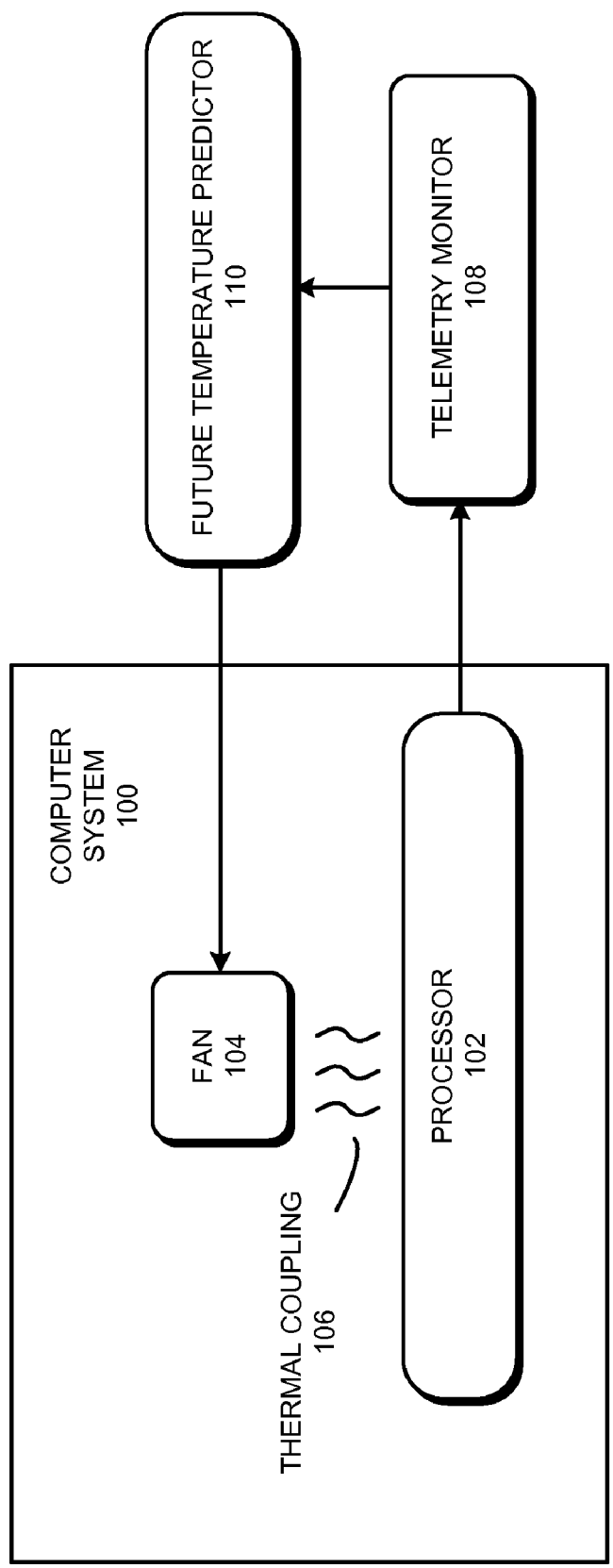
FIG. 1 represents a system that controls temperature variations in a computer system in accordance with some embodiments of the present invention.

FIG. 1 represents a system that controls temperature variations in a computer system in accordance with some embodiments of the present invention. Computer system 100 includes processor 102 and fan 104 which are coupled together by thermal coupling 106.

Processor 102 can generally include any type of processor, including, but not limited to, a microprocessor, a mainframe computer, a digital signal processor, a personal organizer, a device controller, a computational engine within an appliance, and any other processor now known or later developed. Furthermore, processor 102 can include one or more cores.

Note that although FIG. 1 illustrates computer system 100 with one processor, computer system 100 can include more than one processor. In a multi-processor configuration, the processors can be located on a single system board, or multiple system boards. Computer system 100 can include but is not limited to a server, server blade, a datacenter server, or an enterprise computer.

Processor 102 is coupled to telemetry monitor 108. Telemetry monitor 108 is coupled to future temperature predictor 110, and future temperature predictor 110 is coupled to fan 104. Telemetry monitor 108 is any device that can receive a telemetry signal and can be implemented in any combination of hardware and software. In some embodiments, telemetry monitor 108 operates on processor 102. In other embodiments, telemetry monitor 108 operates on one or more service processors. In still other embodiments, telemetry monitor 108 is located inside of computer system 100. In yet other embodiments, telemetry monitor 108 operates on a separate computer system.

In some embodiments telemetry monitor 108 includes a method or apparatus for monitoring and recording computer system performance parameters as set forth in U.S. Pat. No. 7,020,802 which is hereby fully incorporated by reference.

Future temperature predictor 110 is any device that can receive input from telemetry monitor 108 and predict a future temperature of processor 102 based on the received input. Moreover, future temperature predictor 110 can be implemented in any combination of hardware and software. In some embodiments, future temperature predictor 110 operates on processor 102. In other embodiments, future temperature predictor 110 operates on one or more service processors. In still other embodiments, future temperature predictor 110 is located inside computer system 100. In yet other embodiments, future temperature predictor 110 operates on a separate computer system. In some embodiments, future temperature predictor 110 includes an autoregressive moving average process to predict future temperatures.

Fan 104 can include any type of fan that can be controlled by future temperature predictor 110 and used to cool processor 102, and it can be implemented in any technology now known or later developed. In some embodiments, fan 104 can be replaced by multiple fans or by any system that can provide cooling, including but not limited to a thermoelectric cooler or any system that can draw heat from processor 102 implemented in any technology now known or later developed.

In operation, telemetry monitor 108 receives telemetry signals from processor 102. Future temperature predictor 110 receives a signal from telemetry monitor 108 and predicts a future temperature of processor 102. Future temperature predictor 110 then sends a signal to control fan 104 based on the future temperature.

Figure 2:
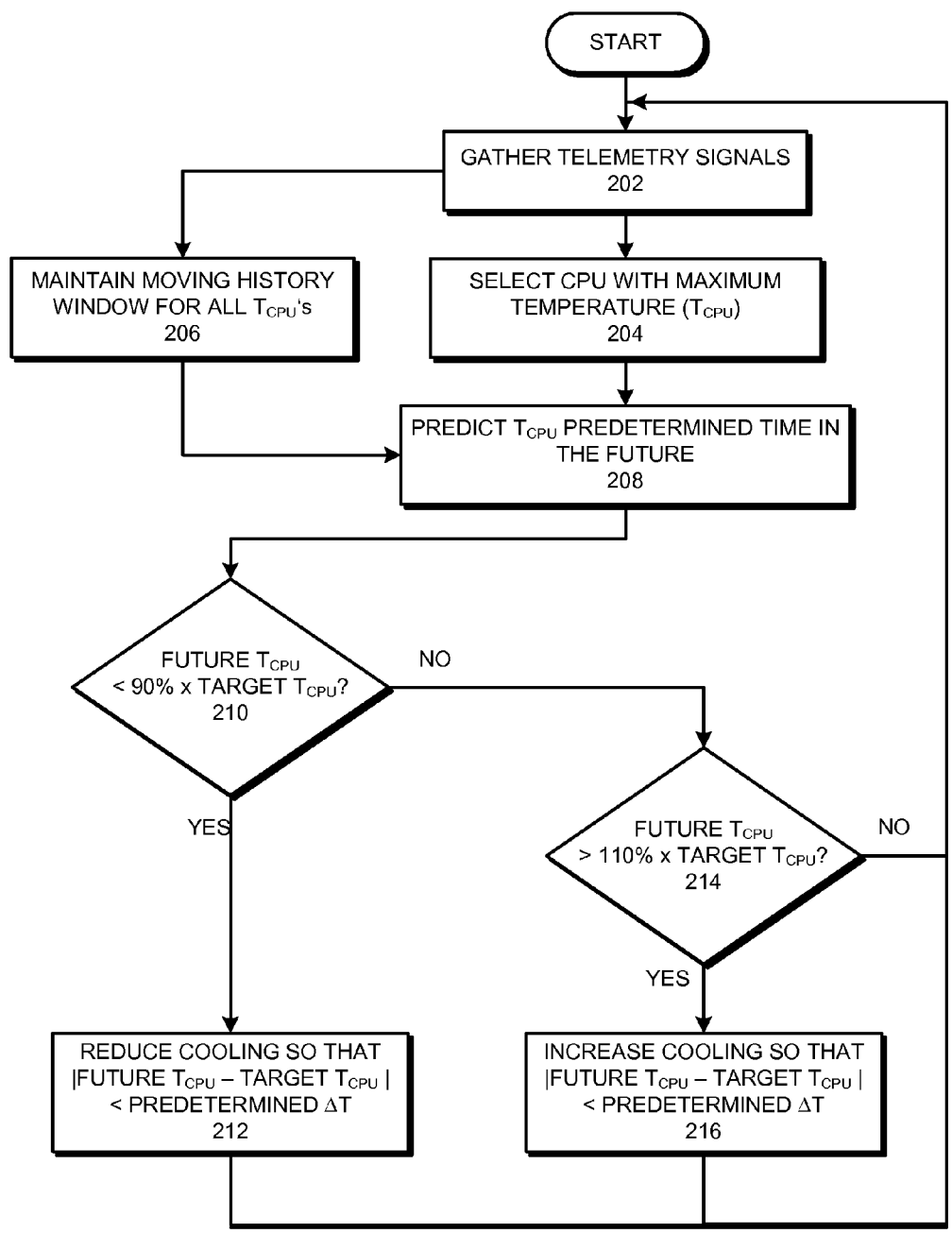
FIG. 2 presents a flow chart illustrating a process that controls temperature variations in a computer system in accordance with some embodiments of the present invention.

In other embodiments, telemetry monitor 108 and fan 104 are coupled to the entire computer system or a portion thereof, including any system, sub-system, component, device, or other physical or logical segments within the computer system or any combination thereof. For example, in some embodiments, telemetry monitor 108 and fan 104 are coupled to a power supply or memory chip in a computer system FIG. 2 presents a flow chart illustrating a process that controls temperature variations in a computer system in accordance with some embodiments of the present invention. First, telemetry signals are gathered (step 202). The telemetry signals include the temperature signals from one or more central processing units (CPU) in a computer system. The CPU with the maximum temperature is selected (step 204), and a moving history window for the temperature of all CPUs is maintained (step 206). The future temperature of the selected CPU is predicted a predetermined time in the future (step 208).

If the future temperature of the CPU is less than 90% of a predetermined target CPU temperature (step 210), then the cooling power of the CPU cooling device is reduced so that the difference between the predicted future temperature of the CPU and the predetermined target CPU temperature is less than a predetermined temperature difference (step 212). It is noted that in some embodiments, the CPU cooling device includes a fan, and the cooling power of the fan is adjusted by adjusting the speed of the fan. The process then returns to step 202.

If the future temperature of the CPU is not less than 90% of the predetermined target CPU temperature (step 210), then the process continues to step 214. If the future temperature of the CPU is greater than 110% of the predetermined target CPU temperature (step 214), then the cooling power of the CPU cooling device is increased so that the difference between the predicted future temperature of the CPU and the predetermined target CPU temperature is less than the predetermined temperature difference (step 216). The process then returns to step 202.

If the future temperature of the CPU is not greater than 110% of the predetermined target CPU temperature (step 214), then the process returns to step 202.

In some embodiments, steps 210 and 214 can use temperature thresholds other than 90% and 110%, respectively, of the target temperature. In other embodiments, these temperature thresholds can each be a different percentage difference from the target temperature, or based on absolute temperature differences from the target temperature. In still other embodiments, the temperature thresholds can be determined based on the smallest temperature difference that can be detected, or adjusted for by the fan.

In still other embodiments, the temperature thresholds are selected based on parameters, including but not limited to: the thermal inertia of the CPU, a predetermined maximum amplitude of temperature fluctuations that is desirable for a CPU to be exposed to, or other telemetry variables of the CPU, including performance parameters as set forth in U.S. Pat. No. 7,020,802.

In some embodiments, the maximum allowable amplitude of temperature fluctuations is based on detrimental thermal cycling effects and their impact on the performance and reliability of the CPU. Detrimental thermal cycling effects can include but are not limited to: solder fatigue; interconnect fretting; differential thermal expansion between bonded materials; delamination failures; thermal mismatches between mating surfaces; differentials in the coefficients of thermal expansion between materials used in chip packages; wirebond shear and flexure fatigue; passivation cracking; electromigration failures; electrolytic corrosion; thermomigration failures; crack initiation and propagation; delamination between chip dies and molding compounds, as well as between the molding compound and the leadframe; die deadhesion fatigue; repeated stress reversals in brackets leading to dislocations, cracks, and eventual mechanical failures; deterioration of connectors through elastomeric stress relaxation in polymers; and any other factors that may adversely affect performance or reliability.

In some embodiments, the temperature fluctuations for multiple CPUs can be controlled at one time. In other embodiments, the temperature fluctuations can be controlled for the entire computer system or a portion thereof, including any system, sub-system, component, device, or other physical or logical segments within the computer system or any combination thereof.

In some embodiments, the predetermined amount of time in the future that the temperature is predicted for in step 208 can be selected based on factors, including but not limited to: thermal inertia of the CPU, or telemetry variables of the CPU including performance parameters of the system, as set forth in U.S. Pat. No. 7,020,802. In other embodiments, methods other than those involving the autoregressive moving average can be used to predict the future temperature.

The foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

What is claimed is:

1. A method for controlling temperature variations in a computer system, comprising:
   determining thresholds surrounding a target temperature based on one or more detrimental thermal cycling effects that reduce at least one of performance and reliability for a CPU for the computer system;
   monitoring a telemetry variable of the computer system;
   predicting a future temperature of the computer system based on the telemetry variable;
   generating a signal in response to the future temperature; and
   sending the signal to a cooling device in the computer system to control temperature variations in the computer system, wherein sending the signal to control the temperature variations includes controlling the temperature variations so that the temperature variations stay within the thresholds surrounding the target temperature.

2. The method of claim 1,
   wherein monitoring the telemetry variable includes systematically monitoring and recording a set of performance parameters of the computer system; and
   wherein the recording process keeps track of the temporal relationships between events in different performance parameters.

3. The method of claim 2 wherein predicting the future temperature of the computer system includes using an autoregressive moving average to predict the future temperature of the computer system.

4. The method of claim 3, wherein generating the signal includes generating the signal to control the temperature variations so that the temperature variations stay within the thresholds surrounding the target temperature.

5. The method of claim 4,
   wherein the cooling device includes a fan; and
   wherein sending the signal to the cooling device includes sending a signal to the fan to control a speed of the fan.

6. The method of claim 1 wherein predicting the future temperature of the computer system includes using an autoregressive moving average to predict the future temperature of the computer system.

7. The method of claim 1,
   wherein predicting the future temperature of the computer system includes predicting the future temperature a predetermined amount of time in the future; and
   wherein the predetermined amount of time is determined based on parameters including a thermal inertia of the CPU.

8. The method of claim 1,
   wherein predicting the future temperature of the computer system includes predicting the future temperature a predetermined amount of time in the future; and
   wherein the predetermined amount of time is determined based on parameters including an amplitude of oscillation of a temperature of the computer system.

9. The method of claim 1, wherein determining the thresholds surrounding a target temperature comprises:
   determining a value that is a first predetermined percentage or a first value lower than the target temperature as a lowest threshold; and
   determining a value that is a second predetermined percentage or a second value higher than the target temperature as a highest threshold,
   wherein controlling the temperature variations so that the temperature variations stay within the thresholds comprises controlling the temperature variations so that the temperature variations stay at least one of above or equal to the lowest threshold and at least one of below or equal to the highest threshold.

10. A computer-readable storage medium storing instructions that when executed by a computer cause the computer to perform a method for controlling temperature variations in a computer system, the method comprising:
    determining thresholds surrounding a target temperature based on one or more detrimental thermal cycling effects that reduce at least one of performance and reliability for a CPU for the computer system;
    monitoring a telemetry variable of the computer system;
    predicting a future temperature of the computer system based on the telemetry variable;
    generating a signal in response to the future temperature; and
    sending the signal to a cooling device in the computer system to control temperature variations in the computer system, wherein sending the signal to control the temperature variations includes controlling the temperature variations so that the temperature variations stay within the thresholds surrounding the target temperature.

11. The computer-readable storage medium of claim 10,
    wherein monitoring the telemetry variable includes systematically monitoring and recording a set of performance parameters of the computer system; and
    wherein the recording process keeps track of the temporal relationships between events in different performance parameters.

12. The computer-readable storage medium of claim 11 wherein predicting the future temperature of the computer system includes using an autoregressive moving average to predict the future temperature of the computer system.

13. The computer-readable storage medium of claim 12, wherein generating the signal includes generating the signal to control the temperature variations so that the temperature variations stay within the thresholds surrounding the target temperature.

14. The computer-readable storage medium of claim 13, wherein the cooling device includes a fan; and
wherein sending the signal to the cooling device includes sending a signal to the fan to control a speed of the fan.

15. The computer-readable storage medium of claim 10 wherein predicting the future temperature of the computer system includes using an autoregressive moving average to predict the future temperature of the computer system.

16. The computer-readable storage medium of claim 10,
wherein predicting the future temperature of the computer system includes predicting the future temperature a predetermined amount of time in the future; and
wherein the predetermined amount of time is determined based on parameters including a thermal inertia of the CPU.

17. The computer-readable storage medium of claim 10,
wherein predicting the future temperature of the computer system includes predicting the future temperature a predetermined amount of time in the future; and
wherein the predetermined amount of time is determined based on parameters including an amplitude of oscillation of a temperature of the computer system.

18. An apparatus for controlling temperature variations in a computer system, comprising:
a determination mechanism configured to determine thresholds surrounding a target temperature based on one or more detrimental thermal cycling effects that reduce at least one of performance and reliability for a CPU for the computer system;
a monitoring mechanism configured to monitor a telemetry variable of the computer system;
a predicting mechanism configured to predict a future temperature of the computer system based on the telemetry variable;
a generating mechanism configured to generate a signal in response to the future temperature; and
a sending mechanism configured to send the signal to a cooling device in the computer system to control temperature variations in the computer system, wherein, while sending the signal to control the temperature variations, the sending mechanism is configured to control the temperature variations so that the temperature variations stay within the thresholds surrounding the target temperature, and wherein the cooling device includes a fan, and wherein sending the signal to the cooling device includes sending a signal to the fan to control a speed of the fan.

19. The apparatus of claim 18,
wherein the monitoring mechanism includes a mechanism configured to systematically monitor and record a set of performance parameters of the computer system; and
wherein the recording process keeps track of the temporal relationships between events in different performance parameters.

20. The apparatus of claim 18, wherein the predicting mechanism includes a mechanism configured to use an autoregressive moving average to predict the future temperature of the computer system.

* * * * *